United States Patent

Sparks

[15] 3,683,030
[45] Aug. 8, 1972

[54] ALKYLATION OF PHENOLIC OR THIOPHENOLIC COMPOUNDS

[72] Inventor: Allen K. Sparks, Des Plaines, Ill.

[73] Assignee: Universal Oil Products Company, Des Plaines, Ill.

[22] Filed: July 14, 1969

[21] Appl. No.: 841,588

[52] U.S. Cl. ............260/613 D, 252/430, 252/431 N, 260/609 D, 260/624 C, 260/625
[51] Int. Cl. .........................C07c 41/00, C07c 39/06
[58] Field of Search ..260/624 C, 613 D, 625, 609 D; 252/430, 431 N

[56] References Cited

UNITED STATES PATENTS

| | | |
|---|---|---|
| 2,516,152 | 7/1950 | Schulze et al. .........260/624 C |
| 3,442,821 | 5/1969 | Hilfman .................252/430 X |
| 2,435,087 | 1/1948 | Luten et al. ......260/624 C UX |
| 2,448,942 | 9/1948 | Winkler et al...260/124 C UX |
| 2,419,599 | 4/1947 | Schulze ...........260/624 C UX |
| 2,450,766 | 10/1948 | Nixon et al. .....260/624 C UX |
| 2,781,404 | 2/1957 | Rosenwald.............260/425 X |

*Primary Examiner*—Howard T. Mar
*Attorney*—James R. Hoatson, Jr. and Bernard L. Kramer

[57] ABSTRACT

Alkylating a phenolic or thiophenolic compound with an alkylating agent in contact with a catalyst comprising silica, metal oxide and nitrogen-containing Lewis base.

10 Claims, No Drawings

ALKYLATION OF PHENOLIC OR THIOPHENOLIC COMPOUNDS

More particularly the present invention relates to an improvement in the alkylation of phenolic or thiophenolic aromatic compounds and is especially useful in the alkylation of phenolic or thiophenolic compounds containing one or more substituents attached to the nucleus. This advantage appears in the production of higher yields of the desired isomer of the alkylated product which, as readily can be seen, is determined with relation to the substituent or substituents attached to the aromatic nucleus.

The phenolic compound which is alkylated in accordance with the present invention includes phenol, alkylphenol, dihydricphenol including catechol, resorcinol, hydroquinone, etc. The thiophenolic compounds include thiophenol, alkylthiophenols and dithiophenols.

In a particularly preferred embodiment, the present invention is directed to the alkylation of hydroxyanisole and more specifically p-hydroxyanisole. A very effective antioxidant for animal and vegetable fats and oils is 3-tert-butyl-4-hydroxyanisole and is prepared by the alkylation of p-hydroxyansiole with tert-butanol, isobutylene or other alkylating agent. An effective catalyst for this reaction is a composite of silica and a metal oxide. While this catalyst does produce high yields of the desired 3-alkyl isomer, it still is desired to even further increase the yields of the 3-alkyl isomer and reduce the yields of the 2-alkyl isomer. This is accomplished in accordance with the present invention which utilizes a novel catalyst for this reaction. Another advantage to the use of the catalyst in the present invention is that a higher yield of the desired isomer is obtained initially and does not necessitate the extremely long break-in period which is required by the prior catalysts.

While the present invention is particularly advantageous for use in the alkylation of hydroxyanisole, it is understood that it also is used for the alkylation of other alkoxy phenols in which the alkoxy group contains from two to 10 or more carbon atoms. Also illustrative are compounds in which the hydroxy group is replaced by a mercapto group and/or the alkoxy group is replaced by a thioalkoxy group.

The catalyst for use in the present invention is a composite of silica and a metal oxide containing a nitrogen-containing Lewis base. The silica generally comprises a major portion of the catalyst composite and may range from 50 to 98 percent thereof and preferably from about 60 to about 90 percent by weight. A particularly preferred metal oxide is alumina, which may comprise from about 2 to about 50 percent and preferably from about 5 to about 40 percent by weight of the catalyst composite. Other silica-metal oxide composites include silica composited with one or more of magnesium, zirconium, thorium, titanium, molybdenum, tungsten, manganese, etc. The silica-metal oxide composite may be synthetically prepared or it may comprise naturally-occurring materials as, for example, aluminum silicates such as Filtrol, Tonsil, etc.

The silica-metal oxide composite preferably is prepared first and this may be accomplished by separate, successive or co-precipitation methods. For example, a suitable acid, such as sulfuric acid, is reacted with sodium silicate solution, such as water glass, to form silica gel. When spherical catalysts are desired, the mixture of acid and water glass is dropped through a suitable orifice or from a rotating disk into a suitable suspending medium, such as mineral oil, Nujol, etc. and maintained therein until the silica gel sets into firm spheres. Usually the spheres are transferred from the forming zone by means of a layer of water disposed beneath the oil layer, and the spheres are washed to remove alkali metal ions. The spheres then are composited with alumina by suspending the same in a suitable aluminum salt solution, such as that of aluminum chloride, aluminum nitrate, aluminum sulfate, etc., and aluminum hydroxide is precipitated by the addition of a suitable basic reagent, after which the composite is dried at a temperature of from about 100° to about 260° C. and calcined at a temperature of from about 400° to about 650° C.

In accordance with the present invention the silica metal oxide composite then is commingled with a nitrogen-containing Lewis base. In a preferred embodiment the nitrogen-containing Lewis base is a heterocyclic nitrogen compound. Quinoline is particularly preferred. Other heterocyclic nitrogen compounds include isoquinoline, quinaldine, indole, acridine, carbazole, pyridine, picoline, pyridazine, pyrimidine, pyrazine, cinnoline, phthalizine, quinazoline, quinoxaline, phenazine, pyrrole, morpholine, etc.

In another embodiment the nitrogen-containing Lewis base is ammonia. In still another embodiment it may comprise an alkylamine which may be the primary, secondary or tertiary amine. Illustrative amines include methylamine, dimethylamine, trimethylamine, ethylamine, diethylamine, trimethylamine, propylamine, dipropylamine, tripropylamine, butylamine, dibutylamine, tributylamine, pentylamine, dipentylamine, tripentylamine, hexylamine, dihexylamine, trihexylamine and higher boiling amines containing from seven to 20 or more carbon atoms in the alkyl group or groups. In still another embodiment the nitrogen-containing Lewis base is a polyamine, having from two to five nitrogen atoms and up to four alkylene groups of two to 10 carbon atoms including alkylenediamine, dialkylenetriamine, trialkylenetetramine, tetralkylenepentamine in which the alkylene group and the alkyl group contain from two to 10 carbon atoms each, as well as these compounds containing hydrocarbyl substituents.

In still another embodiment the nitrogen-containing Lewis base is an alkanolamine which may be a mono, di or trialkanolamine. Illustrative examples include ethanolamine, diethanolamine, triethanolamine, corresponding alkanolamines in which the ethanol group or groups is replaced by an alkyl group of from three to about 20 carbon atoms. In still another embodiment the alkanolamine contains two or more nitrogen atoms including, for example, aminoalkyl alkanolamine in which each alkyl contains from two to 10 carbon atoms, N-hydroxyalkyl-aminoalkyl alkanolamines in which each alkyl contains from two to 10 carbon atoms, dialkylenetriamines containing one or more hydroxyalkyl substituents, trialkylenetetramines containing one or more hydroxyalkyl substituents, etc.

In still another embodiment the nitrogen-containing Lewis base comprises aniline, toluidine, xilidine, naphthylamine, anthracylamine and these compounds containing one or more alkyl groups of from one to 20 carbon atoms each attached to the nucleus, phenylenediamines in which the amine groups are in a position ortho, meta or para to each other and also these compounds having alkyl substituents attached to the nucleus. In still another embodiment the nitrogen-containing Lewis base is cyclohexylamine and derivatives containing one or more alkyl groups attached to the nucleus.

As hereinbefore set forth the heterocyclic nitrogen containing Lewis base is preferred. It is understood that the different nitrogen-containing Lewis bases are not necessarily equivalent because these compounds vary in their basicity. In general, it may be preferred to use higher concentrations of the weaker bases.

The nitrogen-containing Lewis base may be composited with the silica-metal oxide in any suitable manner. Conveniently, this is accomplished by utilizing a suitable solution of the Lewis base. When the Lewis base is sufficiently soluble in water, especially at the low concentrations utilized, an aqueous solution generally is preferred. When the Lewis base is not sufficiently soluble in water, other suitable solvents may be used including those of alcohol, ether, ketone, etc. In one method the silica-metal oxide particles are dipped, soaked or suspended in the solution and, in another method, the solution may be poured over, sprayed onto or otherwise contacted with the silica-metal oxide particles. Excess solution is drained off and the composite then is dried, generally at a temperature of from about 40° to about 200° and preferably from about 50° to about 150° C. When ammonia or other gas is used as the Lewis base, the gas may be passed through the silica-metal oxide particles. Excess gas may be removed by drying at a temperature within the range hereinbefore set forth or a higher temperature if needed.

The nitrogen-containing Lewis base will be present in the final catalyst in a concentration of from about 0.01 percent to about 3 percent and preferably from about 0.05 percent to about 1 percent by weight of the final catalyst.

While it generally is preferred to prepare the silica-metal oxide composite first and then incorporate the Lewis base, it is understood that modifications may be used in which the Lewis base is composited first with the silica or metal oxide and then composited with the remaining components of the catalyst. Also it is understood that the final catalyst may be in the form of spheres, extrudates, pills, tablets, etc. and that these may be formed in any well-known manner.

After preparing the catalyst containing the Lewis base, the catalyst composite may be hydrated prior to use. This may be accomplished by soaking the catalyst particles in water at a temperature of from about ambient to about 75° C. for a time of from 15 minutes to 10 hours or more, excess water may be drained and the catalyst used as such. However, when desired, the catalyst may be partly dried by heating at a temperature of from about 40° to about 90° C. for a period from 5 to 30 minutes.

The alkylation reaction may be effected in either a batch or continuous flow process. In a batch type operation, the reactants and catalyst are introduced into a reaction zone equipped with stirring or other suitable means for effecting intimate contact of the catalyst and reactants. The desired heating may be applied to the reactants and/or reaction zone by well known means. In a continuous type operation, the catalyst is disposed as a fixed bed in a reaction zone and the reactants, at the desired temperature and pressure, are passed into contact with the catalyst in either upward or downward flow. Another type of operation is the suspensoid type of operation in which the catalyst is carried into the reaction zone by means of one or more of the reactants or by means of an inert carrying medium. Another type of operation includes the fluidized type process in which the reactants and catalyst are maintained in a state of turbulence under hindered settling conditions in the reaction zone. The pressure to be employed will depend upon the type of operation to be utilized and will vary from atmospheric to 1,000 pounds or more per square inch. The temperature may range from about 90° to about 200° C. and generally from about 120° to about 175° C.

Any suitable alkylating agent is used. In a preferred embodiment it comprises an alcohol including ethanol, propanol, butanol, pentanol, hexanol, etc. In another embodiment it comprises an olefin including ethylene, propylene, butylene, amylene, hexylene, etc. When a tertiary alkyl configuration is desired, the alcohol used is a tertiary alkanol and the olefin is a tertiary olefin.

The phenolic or thiophenolic compound will be used in a mole ratio to alkylating agent of at least 1:1 but preferably is used in excess and thus will range from 2:10 or more moles of the phenolic or thiophenolic compound per mole of alkylating agent.

When desired, water may be introduced along with the charge to the catalyst zone. The amount of water will range from about 0.1 to about 100 percent of the combined phenolic or thiophenolic compound and alkylating agent but preferably is within the range of from about 1 percent to about 10 percent thereof.

As hereinbefore set forth the novel process of the present invention produces high yields of the desired isomer. This will vary with the particular reactants employed. As a particular advantage to the present invention, high yields of the desired isomer occurs in the initial stages of the reaction and does not require the long break-in period required with other catalysts.

The product from the alkylation reaction may be treated in any suitable manner, such as by fractionation, solvent extraction, etc. to separate unreacted hydroxyanisole, which is recycled to the reaction zone for further conversion therein, and the desired 3-tertiary-alkyl-p-hydroxyanisole. While high yields of the desired isomer is obtained, some 2-tertiary-alkyl-p-hydroxyanisole and some dialkyl-p-hydroxyanisole are produced. However, when effecting the alkylation in accordance with the present invention, the yield of the desired 3-alkyl isomer is increased and the yields of the undesired 2-alkyl isomer and of the dialkyl products are lower than heretofore obtainable.

The following examples are introduced to illustrate further the novelty and utility of the present invention but not with the intention of unduly limiting the same.

EXAMPLE I

The catalyst used in this example was a composite of 75 percent by weight of silica, 25 percent by weight of alumina and 0.1 percent by weight of quinoline. The silica-alumina composite was prepared by the general steps of acidifying water glass, washing, drying, and then commingling aluminum chloride therewith and precipitating with ammonium hydroxide, after which the composite was dried at about 200° C. and calcined at about 595° C. The resulting powder was formed into pills of ⅛ inch by ⅛ inch. The pills then were soaked in an aqueous solution of quinoline in a concentration to form a final composite containing 0.1 percent by weight of quinoline. The catalyst composite was prehydrated by being soaked in water for one-half hour, after which the excess water was drained off and the catalyst was used for the alkylation. The catalyst had an apparent bulk density of 0.64 grams per cc.

The catalyst prepared in the above manner was utilized for the alkylation of p-hydroxyanisole with tert-butyl alcohol. The reactants were passed upwardly through a bed of the catalyst at a temperature of about 140° C. and a pressure of about 125 psi, using a mole ratio of p-hydroxyanisole to tert-butyl alcohol of 10:1.

The reaction products were analyzed by G.L.C. and, based upon the alkylated products, contained 94.3 percent by weight of 3-tert-butyl-4-hydroxyanisole, 4.8 percent by weight of 2-tert-butyl-4-hydroxyanisole and 0.9 percent by weight of 2,5-di-tert-butyl-4-hydroxyanisole.

For comparative purposes, the silica-alumina composite without the addition of quinoline was used for alkylation in the same manner as described above. The alkylated products contained 86.6 percent by weight of 3-tert-butyl-4hydroxyanisole, 9.9 percent by weight of 2-tert-butyl-4hydroxyanisole and 3.5 percent by weight of di-tert-butyl-p-hydroxyanisole.

In comparing the results of these two runs, it will be noted that the catalyst containing quinoline produced about 8 percent more of the desired 3-butyl isomer, about 5 percent less of the undesired 2-butyl isomer and only about 25 percent of the dialkylated product. This increase of almost 8 percent in the desired product is a considerable improvement. Furthermore the considerably lower production of the 2-isomer and of the dialkylated compound results in a product of higher purity and, accordingly, of improved potency for use as an antioxidant.

EXAMPLE II

The catalyst is prepared in substantially the same manner as described in Example I except that it contains 0.2 percent by weight of pyridine. The catalyst is prepared by soaking the silica-alumina particles in an aqueous solution of pyridine, followed by draining off excess solution and drying the composite at 90° C.

The catalyst prepared in the above manner is utilized for the alkylation of phenol with isobutylene at 130° C. and a pressure of about 100 psi, using a mole ratio of phenol to isobutylene of 10:1. The reaction products are analyzed by G.L.C. and contains a high concentration of ortho-butylphenol and only a small amount of the other isomers and of dialkylated phenol.

EXAMPLE III

The catalyst of this example comprises silica-magnesia-morpholine. The silica-magnesia composite is prepared in substantially the same manner as described in Example I to contain 65 percent by weight of silica and 35 percent by weight of magnesia after drying and calcining. The catalyst particles are soaked in an aqueous solution of morpholine in a concentration to prepare a final catalyst containing 0.2 percent by weight of morpholine. Following the soaking step, excess solution is drained and the catalyst then is dried by heating at 85° C.

The catalyst prepared in the above manner is used in the alkylation of p-methylthiophenol with tert-amyl alcohol to form high yields of the 2-tert-amyl-4-methylthiophenol.

EXAMPLE IV

The catalyst prepared in Example I is utilized for the alkylation of p-ethoxyphenol with tertiary butyl alcohol. The alkylation is effected by passing the p-ethoxy-phenol and tert-butyl alcohol upwardly through a bed of the catalyst at a temperature of about 130° C. and a pressure of about 100 psi, using a mole ratio of p-ethoxyphenol to tert-butyl alcohol of 2:1. The alkylated products contains over 90 percent by weight of the 2-tert-butyl-4-ethoxyphenol.

EXAMPLE V

The catalyst of this example comprises silica, alumina and 0.5 percent by weight of aminoethyl ethanolamine. The catalyst is prepared in substantially the same manner as described in Example I by soaking the silica-alumina particles in a solution of the aminoethyl ethanolamine, followed by draining off excess solution and drying at 80° C. The catalyst then is used for the alkylation of para-cresol with isopropyl alcohol at a temperature of 130° C. and a pressure of 100 psi, utilizing a mole ratio of para-cresol to isopropyl alcohol of 1.5:1. The alkylated product contains over 88 percent by weight of 2-isopropyl-4-methylphenol.

I claim as my invention:

1. In a process for alkylating a phenolic or thiophenolic compound with an alkylating agent selected from the group consisting of olefins and alkanols at alkylation conditions, the improvement which comprises effecting said alkylation in contact with a catalyst consisting essentially of (a) from 50 to 98 percent by weight of silica, (b) from about 2 percent to about 50 percent by weight of an oxide of a metal selected from the group consisting of aluminum, magnesium, zirconium, thorium, titanium, molybdenum, tungsten and manganese, and (c) from about 0.01 percent to about 3 percent by weight of a nitrogen-containing Lewis base selected from the group consisting of:

1. heterocyclic nitrogen compounds selected from the group consisting of quinoline, isoquinoline, quinaldine, indole, acridine, carbazole, pyridine, picoline, pyridazine, pyrimidine, pyrazine, cinoline, phthalizine, quinazoline, quinoxaline, phenazine, pyrrole and morpholine;
2. ammonia;
3. alkylamines selected from the group consisting of methylamine, dimethylamine, trimethylamine, ethylamine, diethylamine, triethylamine, propylamine, dipropylamine, tripropylamine, butylamine, dibutylamine, tributylamine, pentylamine, dipentylamine, tripentylamine, hexylamine, dihexylamine and trihexylamine;

4. alkylenepolyamines having up to 4 alkylene groups of two to 10 carbon atoms each and from two to 5 nitrogen atoms;
5. alkanolamines selected from the group consisting of ethanolamine, diethanolamine and triethanolamine;
6. aminoalkyl alkanolamines in which each alkyl contains from two to 10 carbon atoms;
7. N-hydroxyalkyl-aminoalkyl alkanolamines in which each alkyl contains from two to 10 carbon atoms;
8. arylamines in which the aryl is an aromatic hydrocarbon nucleus of from one to three condensed rings;
9. phenylenediamines; and,
10. cyclohexylamine.

2. The improvement of claim 1 wherein said catalyst comprises from about 60 percent to about 90 percent by weight of silica and from about 5 percent to about 40 percent by weight of alumina.

3. The improvement of claim 2 wherein said catalyst comprises silica, alumina and a heterocyclic nitrogen-containing Lewis base.

4. The improvement of claim 3 wherein said heterocyclic nitrogen-containing Lewis base is quinoline.

5. The improvement of claim 3 wherein said heterocyclic nitrogen-containing Lewis base is pyridine.

6. The improvement of claim 3 wherein said heterocyclic nitrogen-containing Lewis base is morpholine.

7. The process of claim 1 wherein said phenolic compound is a phenol.

8. The process of claim 7 wherein said phenolic compound is p-hydroxyanisole.

9. The process of claim 8 wherein said alkylating agent is tertiary-butyl alcohol.

10. The process of claim 8 wherein said alkylating agent is isobutylene.

* * * * *